(12) United States Patent
Wu et al.

(10) Patent No.: US 8,989,215 B2
(45) Date of Patent: Mar. 24, 2015

(54) METHOD, APPARATUS, AND SYSTEM FOR DATA TRANSMISSION

(75) Inventors: Bo Wu, Chengdu (CN); Rong Deng, Chengdu (CN); Zhen Long, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 38 days.

(21) Appl. No.: 13/432,861

(22) Filed: Mar. 28, 2012

(65) Prior Publication Data

US 2012/0250700 A1    Oct. 4, 2012

(30) Foreign Application Priority Data

Mar. 28, 2011    (CN) .......................... 2011 1 0078469

(51) Int. Cl.
*H04L 7/10* (2006.01)
(52) U.S. Cl.
CPC ...................................... *H04L 7/10* (2013.01)
USPC ........................................................... 370/464
(58) Field of Classification Search
None
See application file for complete search history.

(56) References Cited

U.S. PATENT DOCUMENTS 5,530,806 A * 6/1996 Condon et al. ................... 714/49
7,630,399 B2 * 12/2009 Shang ............................ 370/466
7,983,308 B1 * 7/2011 Johnston et al. ............... 370/514
2002/0159483 A1 * 10/2002 Clauberg ....................... 370/503
2004/0213248 A1 * 10/2004 Okuda et al. ................ 370/395.1
2009/0080564 A1   3/2009 Haas
2009/0180479 A1 * 7/2009 Powers ....................... 370/395.1

FOREIGN PATENT DOCUMENTS

CN       1556593 A       12/2004
CN     101605012 A       12/2009
EP        872085 B1 *    12/2004

OTHER PUBLICATIONS

Search Report issued in corresponding Chinese Patent Application No. 2011100784693, mailed Apr. 24, 2013, 2 pages.

* cited by examiner

*Primary Examiner* — Ian N Moore
*Assistant Examiner* — Latresa McCallum
(74) *Attorney, Agent, or Firm* — Brinks Gilson & Lione

(57) ABSTRACT

The present invention provides a method for locating a data frame. The method mainly includes: allocating a framing state machine to each byte of a data stream within a current clock cycle; respectively starting, by the framing state machines, hunting for data frames from respective corresponding bytes, and obtaining a plurality of data frame hunt results; and selecting one hunt result from the plurality of data frame hunt results according to a data frame hunt result within a previous clock cycle as a data frame hunt result within the current clock cycle.

13 Claims, 3 Drawing Sheets

11
Allocate a framing state machine to each byte of a data stream within a current clock cycle, and the framing state machines respectively start hunting for data frames from respective corresponding bytes and obtain a plurality of data frame hunt results 12
Determine a starting byte of a first data frame within the current clock cycle according to a data frame hunt result within a previous clock cycle. Match the plurality of data frame hunt results respectively with the starting byte of the first data frame within the current clock cycle, and use a successfully-matched hunt result as a data frame hunt result within the current clock cycle Octet transmission order ↓

| 1 | PLI | <15:08> |
| 2 | PLI | <7:00> |
| 3 | cHEC | <15:08> |
| 4 | cHEC | <7:00> |

G.7041/Y.1303_F6-2

1 2 3 4 5 6 7 8 → Bit transmission order

FIG. 3

Apparatus for locating a data frame

Hunt processing module 42

Hunt result determining module 42

FIG. 4

METHOD, APPARATUS, AND SYSTEM FOR DATA TRANSMISSION

CROSS-REFERENCE TO RELATED APPLICATION

This application claims priority to Chinese Patent Application No. 201110078469.3, filed on Mar. 28, 2011, which is hereby incorporated by reference in its entirety.

FIELD OF THE INVENTION

The present invention relates to the field of communications technologies, and in particular, to a method and an apparatus for locating a data frame.

BACKGROUND OF THE INVENTION

With convergence of communications networks, intercommunication and interconnection between an optical transport network and an IP network, as well as other networks, are widely applied. When functioning as a physical layer network of a network of another type, an optical transport network must encapsulate data of the network of another type in a certain format, and the most common encapsulation form is GFP (Generic framing procedure, generic framing procedure) encapsulation.

Common GFP encapsulation is often applied to 1 G-10 G low rate code streams. Therefore, the maximum bit width of encapsulated data is 64 bits. However, with rapid development of networks, encapsulated data streams range from 40 G to 200 G and the data bit width then changes to range from 128 bits to 512 bits. As regards these data streams with large bit widths, a plurality of data frames may be encapsulated within a clock cycle. For example, when a data stream has a bit width of 521 bits, data of each clock cycle is 512/8=64 bytes, and usually the length of a GFP frame is 12 bytes, so that five data frames may be encapsulated within a clock cycle.

In the prior art, a method for performing a frame location on a GFP frame encapsulated within a clock cycle is: adopting a framing state machine to perform a hunt on a data stream within a current clock cycle byte by byte, and determine a starting byte of a header of a GFP frame. The framing state machine includes three states, which respectively are: a HUNT (hunt) state, a PRESYNC (preliminary synchronization) state, and a SYNC (synchronization) state.

The framing state machine is in the HUNT state when a hunt starts, and starts the hunt from a first byte of the data stream in the current clock cycle. After a byte conforming to features of a header of a first GFP frame is hunted out, the state of the framing state machine changes to the PRESYNC state. Then, according to length information of the GFP frame carried in the byte conforming to the features of the header of the GFP frame, the framing state machine hunts out a starting byte of a header of a second GFP frame. After authentication on the starting byte of the header of the GFP frame succeeds, the state of the framing state machine changes to the SYNC state. The framing state machine determines that the starting bytes of the header of the first GFP frame and the header of the second GFP frame are correct, and records the starting bytes of the header of the first GFP frame and the header of the second GFP frame and lengths of the frames in the hunt result. Then, the framing state machine continues the hunt from the starting byte of the header of the second GFP frame until a set hunt period corresponding to the current clock cycle ends.

When the framing state machine is in the PRESYNC state or SYNC state, if the starting byte of the header of the second GFP frame is hunted out, but authentication on the starting byte fails, the framing state machine changes to the HUNT state.

In the implementation of the present invention, the inventor finds that the method for performing a frame location on a GFP frame encapsulated within a clock cycle in the prior art at least has the following problem: since the period of a clock cycle is very short, the set hunt period corresponding to the current clock cycle is also very short. The framing state machine starts the hunt from the first byte of the data stream within the current clock cycle. If the first byte is not the starting byte of the GFP frame, and when a plurality of data frames are encapsulated within the current clock cycle, the method may fail to hunt out a correct starting byte of the GFP frame, and as a result, cannot locate a GFP frame encapsulated in the data stream within the current clock cycle.

SUMMARY OF THE INVENTION

Embodiments of the present invention provide a method and an apparatus for locating a data frame, so as to efficiently locate a data frame encapsulated in a data stream within a clock cycle.

A method for locating a data frame includes:

obtaining a data stream within a current clock cycle, and allocating a framing state machine to each byte of the date stream within the current clock cycle;

respectively starting, by the framing state machines, hunting for data frames from respective corresponding bytes, and obtaining a plurality of data frame hunt results, where the hunt result includes a starting byte of a first data frame hunted out by each framing state machine;

determining a starting byte of a first data frame within the current clock cycle according to a data frame hunt result within a previous clock cycle; and matching the plurality of data frame hunt results respectively with the starting byte of the first data frame within the current clock cycle, and using a successfully-matched hunt result as a data frame hunt result within the current clock cycle.

An apparatus for locating a data frame includes:

a hunt processing module, configured to obtain a data stream within a current clock cycle, and allocate a framing state machine to each byte of the data stream within the current clock cycle, where the framing state machines respectively start hunting for data frames from respective corresponding bytes and obtain a plurality of data frame hunt results, and the hunt result includes a starting byte of a first data frame hunted out by each framing state machine; and a hunt result determining module, configured to determine a starting byte of a first data frame within the current clock cycle according to a data frame hunt result within a previous clock cycle, match the plurality of data frame hunt results obtained by the hunt processing module respectively with the starting byte of the first data frame within the current clock cycle, and use a successfully-matched hunt result as a data frame hunt result within the current clock cycle.

From the technical solutions provided by the embodiments of the present invention, it can be seen that, in the embodiments of the present invention, a framing state machine is allocated to each byte of a data stream within a current clock cycle, and the framing state machines respectively start hunting for data frames from respective corresponding bytes concurrently, so that a starting byte of a data frame encapsulated in the data stream within the current clock cycle can be quickly hunted out, thereby quickly hunting out a plurality of data frames encapsulated in the data stream within the current clock cycle, and accurately locating the data frames encapsulated in the data stream within the current clock cycle.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art may further derive other drawings according to these accompanying drawings without creative efforts.

FIG. 3 is a schematic diagram of a GFP frame format according to Embodiment 1 of the present invention;

FIG. 4 is a specific structure diagram of an apparatus for locating a data frame according to an embodiment of the present invention;

DETAILED DESCRIPTION OF THE EMBODIMENTS

In order to make the objectives, technical solutions, and advantages of the present invention more comprehensible, the technical solutions according to embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts should fall within the protection scope of the present invention.

To make the embodiments of the present invention more comprehensible, the present invention is further illustrated in the following with reference to the accompanying drawings and several specific embodiments, and the embodiments are not intended to limit the present invention.

Embodiment 1

Figure 1:
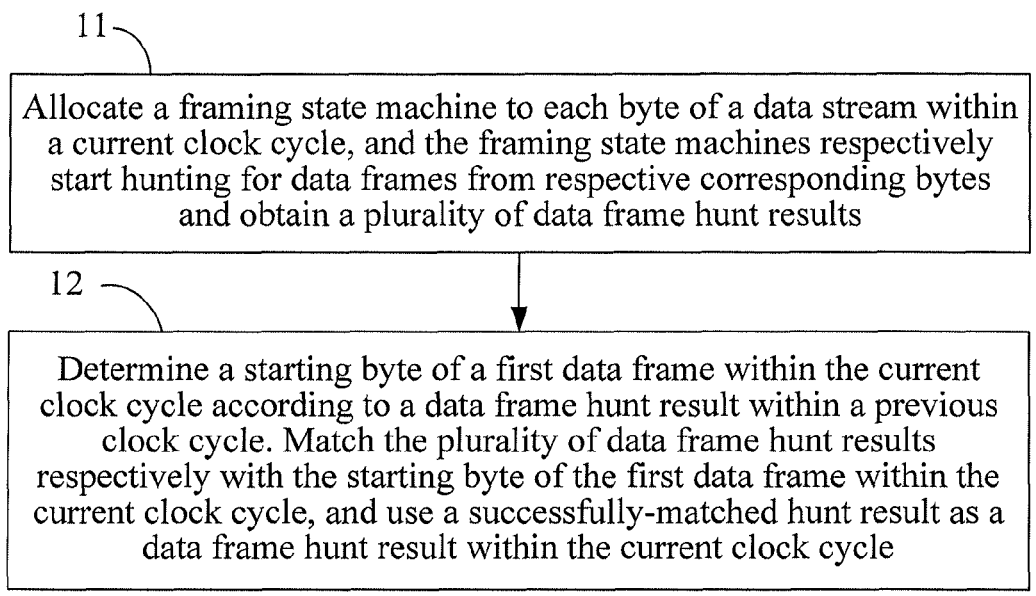
FIG. 1 is a processing flowchart of a method for locating a data frame according to Embodiment 1 of the present invention.

A processing flowchart of a method for locating a data frame according to the embodiment is as shown in FIG. 1, and includes the following processing steps.

Step 11: Allocate a framing state machine to each byte of a data stream within a current clock cycle, and the framing state machines respectively start hunting for data frames from respective corresponding bytes and obtain a plurality of data frame hunt results.

The data frame in the embodiment of the present invention may be a GFP frame. The GFP frame is used as an example to illustrate the embodiment of the present invention in the following.

When a hunt period corresponding to a previous clock cycle ends, the state of the framing state machine is: a PRESYNC state or a SYNC state. The embodiment of the present invention assumes that each byte of the data stream within the current clock cycle may be a starting byte of a GFP frame, adopts a plurality of framing state machines with a number equal to the total number of bytes in the data stream within the current clock cycle, and allocates a framing state machine to each byte of the data stream within the current clock cycle, where the framing state machines respectively start hunting for data frames from respective corresponding bytes and obtain a plurality of GFP frame hunt results, and the hunt results correspond to different starting bytes.

The previous clock cycle may be a last clock cycle.

Step 12: Determine a starting byte of a first data frame within the current clock cycle according to a data frame hunt result within a previous clock cycle. Match the plurality of data frame hunt results respectively with the starting byte of the first data frame within the current clock cycle, and use a successfully-matched hunt result as a data frame hunt result within the current clock cycle.

The starting byte of the first data frame within the current clock cycle is determined according to the data frame hunt result within the previous clock cycle.

The plurality of data frame hunt results are respectively matched with the starting byte of the first data frame within the current clock cycle, and the successfully-matched hunt result is determined as the data frame hunt result within the current clock cycle.

Figure 2:
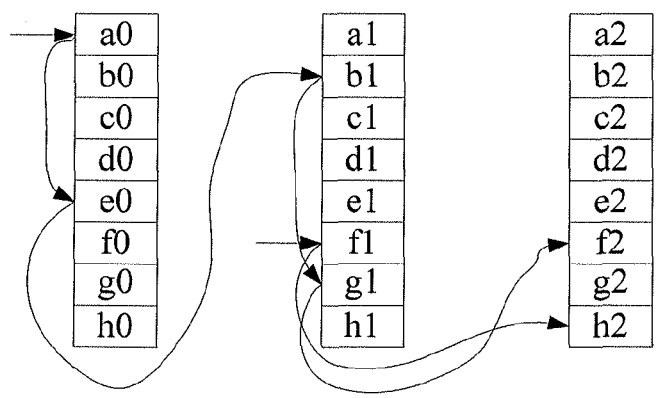
FIG. 2 is a schematic diagram of a match performed between a GFP frame hunt result within a previous clock cycle and GFP frame hunt results within a current clock cycle according to Embodiment 1 of the present invention.

A schematic diagram of a match performed between a GFP frame hunt result within a previous clock cycle and GFP frame hunt results within a current clock cycle according to the embodiment is as shown in FIG. 2. In FIG. 2, a0-h0 are eight bytes of a data stream within clock cycle 0; a1-h1 are eight bytes of a data stream within clock cycle 1; and a2-h2 are eights bytes of a data stream within clock cycle 2. Within clock cycle 1, eight framing state machines are adopted to respectively start a hunt from a1, b1, c1, d1, e1, f1, g1, or h1, and eight hunt results are obtained. In two of the eight hunt results, a GFP frame is hunted out. A position of a GFP frame hunted out by a framing state machine which starts a hunt from b1 is: b1→g1→f2. A position of a GFP frame hunted out by a framing state machine which starts a hunt from f1 is: f1→h2. According to the GFP frame hunt result within clock cycle 0, a starting byte of a header of the last GFP frame within clock cycle 0 is e0, and a PLL field of the header indicates that a starting byte of a first GFP frame within clock cycle 1 is b1. Therefore, it is determined that the position of the GFP frame hunted out by the framing state machine which starts the hunt from b1, namely, b1→g1→f2, is correct.

Then, the GFP frame hunt result within the current clock cycle and the state of the framing state machine when the hunt ends are transmitted to a next clock cycle.

From the technical solution provided by the embodiment, it can be seen that, in the embodiment of the present invention, a framing state machine is allocated to each byte of a data stream within a current clock cycle, and the framing state machines respectively start hunting for data frames from respective corresponding bytes concurrently, so that a starting byte of a header of a data frame, such as a first GFP frame, encapsulated in the data stream within the current clock cycle can be quickly hunted out, thereby quickly hunting out a plurality of data frames, such as GFP frames, encapsulated in the data stream within the current clock cycle, and accurately locating the data frames, such as the GFP frames, encapsulated in the data stream within the current clock cycle.

Specifically, the allocating the framing state machine to each byte of the data stream within the current clock cycle, and concurrently starting, by the framing state machines, hunting for the data frames respectively from the respective corresponding bytes in step 11 may include:

after receiving each byte of the data stream within the current clock cycle, first preprocessing the data stream, performing an HEC (hybrid error control, hybrid error control) calculation on values of every two adjacent bytes of the data stream, and storing obtained HEC calculation results of the values of every two adjacent bytes. As regards a specific operation, the HEC calculation may be performed concurrently on the values of the every two adjacent bytes by using a plurality of arithmetic logics. The preprocessing process may improve the speed of HEC authentication calculation in a hunting process of the subsequent GFP frame.

In practical applications, different GFP frame header hunt results may be obtained by adopting a framing state machine to start hunting from different bytes of a data stream within a clock cycle. When a hunt period corresponding to a previous clock cycle ends, the state of the framing state machine is: a PRESYNC state or a SYNC state. The embodiment of the present invention assumes that each byte of the data stream within the current clock cycle may be a header of a GFP frame. Assuming that the number of bytes of the data stream within the current clock cycle is N, N framing state machines are selected and each framing state machine corresponds to a frame hunting channel. Each framing state machine utilizes the stored HEC calculation results of the values of every two adjacent bytes to simultaneously start hunting for a header of a GFP frame from each byte and obtains N GFP frame header hunt results. For example, if the data stream has a bit width of 512 bits, the date stream within the current clock cycle includes 512/8=32 bytes, 32 framing state machine which respectively correspond to frame hunting channel 1, frame hunting channel 2, . . . , and frame hunting channel 32 are adopted. The first framing state machine starts a hunt from the first byte in frame hunting channel 1, the second framing state machine starts a hunt from the second byte in frame hunt channel 2, . . . , and the 32nd framing state machine starts a hunt from the 32nd byte in frame hunt channel 32.

The state of each framing state machine when starting a hunt may be the same as the state of the framing state machine when a hunt period corresponding to a previous clock cycle ends, namely, the PRESYNC state or the SYNC state, or may be randomly set as one of all possible states of the framing state machine.

Each framing state machine selects four consecutive adjacent bytes starting from a first byte of starting a hunt, compares HEC calculation results of values of first two adjacent bytes in the four consecutive adjacent bytes with values of last two adjacent bytes, and in case of equivalence, determines that a first byte in the first two adjacent bytes is the starting byte of the first GFP frame. Then, a length of the first GFP frame is determined according to the values of the first two adjacent bytes, and a starting byte of a second GFP frame is determined according to the length of the first GFP frame. Starting from the starting byte of the second GFP frame, HEC calculation results of values of first two adjacent bytes are compared with values of last two adjacent bytes, and in case of equivalence, the framing state machine determines that positions of the first GFP frame and the second GFP frame are correct, and records the starting bytes and length information of the first GFP frame and the second GFP frame in the hunt result. The state of the framing state machine is set to the SYNC state.

Then, the framing state machine continues the data frame hunting process starting from the starting byte of the second data frame until a set hunt period corresponding to the current clock cycle ends. Therefore, if a plurality of GFP frame headers is hunted out in a hunt process, the hunt result includes starting bytes of the plurality of GFP frames and length information of the GFP frames.

Specifically, step 11 may further include the following.

When the hunt period corresponding to the previous clock cycle ends, the state of the framing state machine is: the HUNT state. Since according to a GFP frame hunt result within the previous clock cycle, neither a starting byte of the last GFP frame within the previous clock cycle nor a starting byte of the first GFP frame within the current clock cycle can be obtained, a framing state machine in the HUNT state is adopted to start a hunt from the first byte of the data stream within the current clock cycle.

Specifically, the determining the starting byte of the first data frame within the current clock cycle according to the data frame hunt result within the previous clock cycle in step 12 may include the following.

A schematic diagram of a GFP frame format is as shown in FIG. 3. A GFP frame is formed by a core header and a payload area, where the core header includes a payload length indicator field (PLL field) having two bytes and a core header error correction field (cHEC field) having two bytes. A value of the PLL field indicates a length of the payload area of the GFP frame. A value obtained after performing an HEC calculation on the value of the PLL field is equal to a value of the cHEC field.

When the hunt period corresponding to the previous clock cycle ends, the state of the framing state machine is: the PRESYNC state or the SYNC state. According to a frame hunt result within the previous clock cycle, the value of the PLL field of the header of the last GFP frame and a starting byte of the last GFP frame within the previous clock cycle are obtained. A length of the last GFP frame within the previous clock cycle is determined according to the value of the PLL field, and then the starting byte of the first GFP frame within the current clock cycle is determined according to the length and the starting byte of the last GFP frame within the previous clock cycle.

Specifically, in step 12, the plurality of data frame hunt results is respectively matched with the starting byte of the first data frame within the current clock cycle, and the successfully-matched hunt result is used as a data frame hunt result within the current clock cycle.

The plurality of GFP frame hunt results is respectively matched with the starting byte of the first GFP frame within the current clock cycle determined according to the length and the starting byte of the last GFP frame within the previous clock cycle. If a starting byte of a first GFP frame in a hunt result is the same as the starting byte of the first GFP frame within the current clock cycle determined according to the length and the starting byte of the last GFP frame within the previous clock cycle, and the hunt result is obtained by starting a hunt from the starting byte of the first GFP frame, it is determined that the hunt result is the GFP frame hunt result within the current clock cycle, and a GFP frame encapsulated in the data stream within the current clock cycle may be located according to the hunt result.

From the technical solution provided by the embodiment of the present invention, it can be seen that, the embodiment of the present invention does not limit the number of data frames, such as GFP frames, encapsulated in a data stream within a clock cycle, and it is unnecessary to fill in an empty frame for locating the data frame, thereby saving the data transmission bandwidth of the network.

By first preprocessing a data stream within a clock cycle and storing HEC calculation results of values of every two adjacent bytes, the embodiment of the present invention may improve the speed of HEC authentication calculation in the subsequent GFP frame hunting process, thereby further improving the efficiency of locating a data frame, such as a GFP frame, within the current clock cycle.

Persons of ordinary skill in the art may understand that, all or a part of processes in the method according to the embodiments may be accomplished by a computer program instructing relevant hardware. The program may be stored in a computer-readable storage medium. When the program is executed, the process of the method according to the embodiments of the present invention is performed. The storage medium may be a magnetic disk, an optical disk, a read-only memory (Read-Only Memory, ROM), a random access memory (Random Access Memory, RAM), or the like.

An embodiment of the present invention further provides an apparatus for locating a data frame, having a specific structure as shown in FIG. 4, and including the following modules:

a hunt processing module 41, configured to obtain a data stream within a current clock cycle, and allocate a framing state machine to each byte of the data stream within the current clock cycle, where the framing state machines respectively start hunting for data frames from respective corresponding bytes and obtain a plurality of data frame hunt results, and the hunt result includes a starting byte of a first data frame hunted out by each framing state machine; and a hunt result determining module 42, configured to determine a starting byte of a first data frame within the current clock cycle according to a data frame hunt result within a previous clock cycle, match the plurality of data frame hunt results obtained by the hunt processing module 41 respectively with the starting byte of the first data frame within the current clock cycle, and use a successfully-matched hunt result as a data frame hunt result within the current clock cycle.

From the technical solution provided by the embodiment, it can be seen that in the embodiment of the present invention, a framing state machine is allocated to each byte of a data stream within a current clock cycle, and the framing state machines respectively start hunting for data frames from respective corresponding bytes concurrently, so that a starting byte of a header of a data frame encapsulated in the data stream within the current clock cycle can be quickly hunted out, thereby quickly hunting out a plurality of data frames encapsulated in the data stream within the current clock cycle, and accurately locating the data frames encapsulated in the data stream within the current clock cycle.

Figure 5:
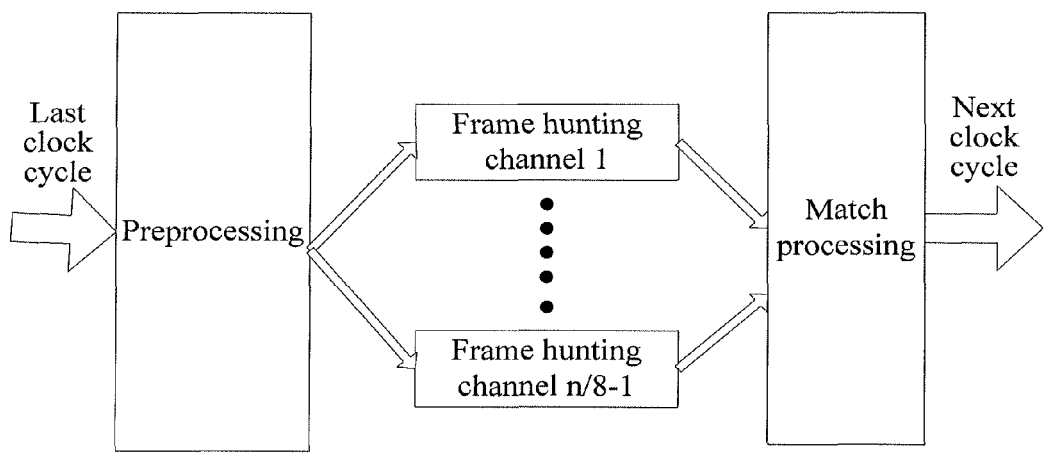
FIG. 5 is a schematic diagram of principles of another apparatus for locating a data frame according to an embodiment of the present invention.
Figure 6:
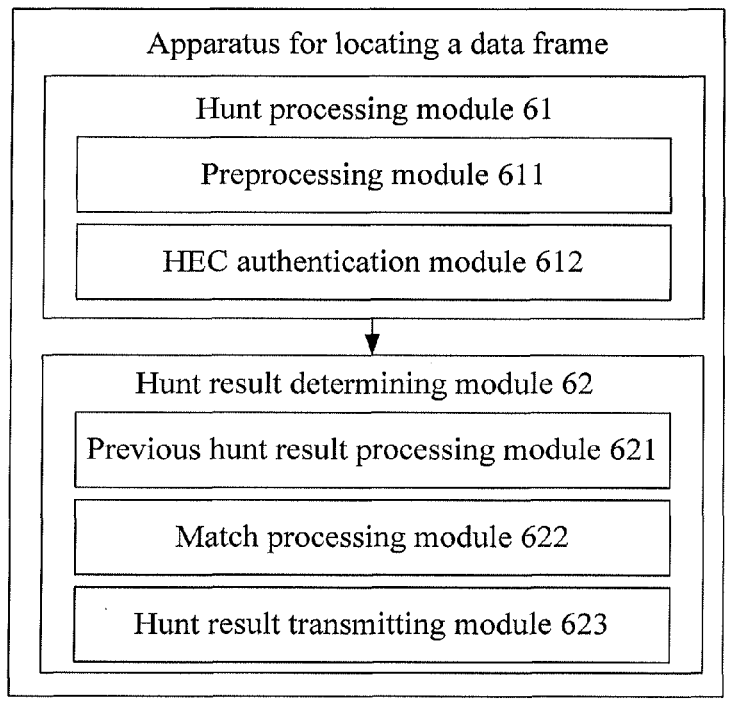
FIG. 6 is a specific structure diagram of another apparatus for locating a data frame according to an embodiment of the present invention.

An embodiment of the present invention further provides another apparatus for locating a data frame; a schematic diagram of the implementation principles thereof is as shown in FIG. 5; and a specific structure thereof is shown in FIG. 6, including the following modules:

a hunt processing module 61, configured to obtain a data stream within a current clock cycle, and allocate a framing state machine to each byte of the data stream within the current clock cycle, where the framing state machines respectively start hunting for data frames from respective corresponding bytes and obtain a plurality of data frame hunt results, and the hunt result includes a starting byte of a first data frame hunted out by each framing state machine; and a hunt result determining module 62, configured to determine a starting byte of a first data frame within the current clock cycle according to a data frame hunt result within a previous clock cycle, match the plurality of data frame hunt results obtained by the hunt processing module 61 respectively with the starting byte of the first data frame within the current clock cycle, and use a successfully-matched hunt result as a data frame hunt result within the current clock cycle.

Specifically, the hunt processing module 61 may include:

a preprocessing module 611, configured to, after receiving each byte of a data stream within a clock cycle, first perform a hybrid error control HEC calculation on values of every two adjacent bytes of the data stream, and store obtained HEC calculation results of the values of every two adjacent bytes; and an HEC authentication module 612, configured to enable each framing state machine to select four consecutive adjacent bytes starting from a first byte of starting a hunt, compare HEC calculation results of values of first two adjacent bytes in the four consecutive adjacent bytes with values of last two adjacent bytes, and in case of equivalence, determine that a first byte in the first two adjacent bytes is the starting byte of the first data frame;

determine a length of the first data frame according to the values of the first two adjacent bytes, then determine a starting byte of a second data frame according to the length of the first data frame and the starting byte of the first data frame, comparing HEC calculation results of values of first two adjacent bytes with values of last two adjacent bytes starting from the starting byte of the second data frame, and in case of equivalence, determine that positions of the first data frame and the second data frame are correct, and record the starting bytes and length information of the first data frame and the second data frame in the hunt result; and continue the data frame hunting process starting from the starting byte of the second data frame until a set hunt period corresponding to the current clock cycle ends.

Specifically, the hunt result determining module 62 may include:

a previous hunt result processing module 621, configured to obtain a value of a payload length indicator field of a header of a last data frame within the previous clock cycle and a starting byte of the last data frame according to the data frame hunt result within the previous clock cycle, and determine a length of the last data frame within the previous clock cycle according to the value of the payload length indicator field; and determine the starting byte of the first data frame within the current clock cycle according to the length and the starting byte of the last data frame within the previous clock cycle;

a match processing module 622, configured to, when the starting byte of the first data frame in the hunt result obtained by the hunt processing module 61 is the same as the starting byte of the first data frame within the current clock cycle obtained by the previous hunt result processing module 621 according to the length and the starting byte of the last data frame within the previous clock cycle, and the hunt result is obtained by starting the hunt from the starting byte of the first data frame, determine that the hunt result is the data frame hunt result within the current clock cycle; and a hunt result transmitting module 623, configured to deliver the data frame hunt result within the current clock cycle and a state of the framing state machine when the hunt ends to a next clock cycle.

Based on the above, from the technical solutions provided by the embodiments of the present invention, it can be seen that in the embodiments of the present invention, a framing state machine is allocated to each byte of a data stream within a current clock cycle, and the framing state machines respectively start hunting for data frames from respective corresponding bytes concurrently, so that a starting byte of a header of a data frame, such as a first GFP frame, encapsulated in the data stream within the current clock cycle can be quickly hunted out, thereby quickly hunting out a plurality of data frames, such as GFP frames, encapsulated in the data stream within the current clock cycle, and accurately locating the data frames, such as the GFP frames, encapsulated in the data stream within the current clock cycle.

The embodiments of the present invention do not limit the number of data frames, such as GFP frames, encapsulated in a data stream within a clock cycle, and it is unnecessary to fill in an empty frame for locating the data frame, thereby saving the data transmission bandwidth of the network.

By first preprocessing a data stream within a clock cycle and storing HEC calculation results of values of every two adjacent bytes, the embodiments of the present invention may improve the speed of HEC authentication calculation in the subsequent GFP frame hunting process, thereby further improving the efficiency of locating a data frame, such as a GFP frame, within the current clock cycle.

The above descriptions are merely exemplary embodiments of the present invention, but not intended to limit the protection scope of the present invention. All variations or substitutions that can be easily figured out by persons skilled in the art within the technical scope of the present invention should fall within the protection scope of the present invention. Therefore, the protection scope of the invention is subject to the protection scope of the claims.

What is claimed is:

1. A method for locating a data frame, comprising: obtaining a data stream within a current clock cycle and allocating a plurality of respective framing state machines to each corresponding byte of the date stream within the current clock cycle;
    respectively and simultaneously starting, by each of the plurality of corresponding framing state machines, hunting for a plurality of data frames from the respective corresponding bytes, and obtaining corresponding plurality of data frame hunt results, wherein the framing state machines change states based on the corresponding plurality of data frame hunt results and wherein a first corresponding data frame hunt result comprises a corresponding first starting byte of a first data frame hunted out by a first respective framing state machine;
    selecting, by each respective framing state machine, four consecutive adjacent bytes starting from a first byte of starting a hunt, comparing HEC calculation results of values of first two adjacent bytes in the four consecutive adjacent bytes with values of last two adjacent byes, and in case of equivalence, determining that a first byte in the first two adjacent bytes is the corresponding first starting byte of the first data frame;
    performing a hybrid error control (HEC) calculation on values of every two adjacent bytes of the data stream;
    determining by a first respective framing state machine from the plurality of corresponding framing state machines, the corresponding first starting byte of the first data frame within the current clock cycle according to a previous corresponding data frame hunt result within a previous clock cycle; and
    respectively, matching the corresponding plurality of data frame hunt results to the corresponding first starting byte of the first data frame as a successfully-matched hunt result within the current clock cycle.

2. The method for locating a data frame according to claim 1, further comprising:
    after receiving each corresponding byte of the data stream within the current clock cycle, performing the HEC calculation on values of every two adjacent bytes of the data stream and storing obtained HEC calculation results of the values of every two adjacent bytes.

3. The method for locating a data frame according to claim 2, wherein the respectively starting, by each of the plurality of respective framing state machines, hunting for the plurality of data frames from the respective corresponding bytes, comprising:
    determining a length of the first data frame according to the values of the first two adjacent bytes, then determining a starting byte of a second data frame according to the length of the first data frame and the starting byte of the first data frame, comparing HEC calculation results of values of first two adjacent bytes with values of last two adjacent bytes starting from the starting byte of the second data frame, and in case of equivalence, determining that positions of the first data frame and the second data frame are correct, and recording the starting bytes and length information of the first data frame and the second data frame in the hunt result; and
    continuing the data frame hunting process starting from the starting byte of the second data frame until a set hunt period corresponding to the current clock cycle ends.

4. The method for locating a data frame according to claim 1, wherein the determining the starting byte of the first data frame within the current clock cycle according to the data frame hunt result within the previous clock cycle, comprising:
    obtaining a value of a payload length indicator field of a header of a last data frame within the previous clock cycle and a corresponding starting byte of the last data frame according to the previous corresponding data frame hunt result within the previous clock cycle, and determining a length of the last data frame within the previous clock cycle according to the value of the payload length indicator field; and
    determining the corresponding first starting byte of the first data frame within the current clock cycle according to the length and the corresponding starting byte of the last data frame within the previous clock cycle.

5. The method for locating a data frame according to claim 1, wherein the matching the plurality of data frame hunt results respectively with the starting byte of the first data frame within the current clock cycle and using the successfully-matched hunt result as the data frame hunt result within the current clock cycle comprises:
    when the starting byte of the first data frame in the hunt result is the same as the starting byte of the first data frame within the current clock cycle, and the hunt result is obtained by starting the hunt from the starting byte of the first data frame, determining that the hunt result is the data frame hunt result within the current clock cycle; and transmitting the data frame hunt result within the current clock cycle and a state of the framing state machine when the hunt ends to a next clock cycle.

6. The method for locating a data frame according to claim 1, wherein the data frame comprises a core header that comprises a payload length indicator field (PLL field) and a core header error correction field (cHEC field) having two bytes.

7. The method for locating a data frame according to claim 6, wherein a value obtained after performing an HEC calculation on the value of the PLL field is equal to a value of the cHEC field.

8. An apparatus for locating a data frame, comprising:
a hunt processing module, configured to obtain a data stream within a current clock cycle and allocate a plurality of respective framing state machines to each corresponding byte of the data stream within the current clock cycle,
wherein the hunt processing module comprises a preprocessing module configured to perform a hybrid error control (HEC) calculation on values of every two adjacent bytes of the data stream, wherein:
the framing state machines respectively and simultaneously start hunting for a plurality of data frames from the respective corresponding bytes, obtain corresponding plurality of data frame hunt results, and change among states based on the corresponding plurality of data frame hunt results, a first corresponding data frame hunt result comprises a corresponding first starting byte of a first data frame hunted out by a first respective framing state machine; and
selecting, by each respective framing state machine, four consecutive adjacent bytes starting from a first byte of starting a hunt, comparing HEC calculation results of values of first two adjacent bytes in the four consecutive adjacent bytes with values of last two adjacent byes, and in case of equivalence, determining that a first byte in the first two adjacent bytes is the corresponding first starting byte of the first data frame;
a hunt result determining module, configured to determine the corresponding first starting byte of the first data frame within the current clock cycle according to a previous corresponding data frame hunt result within a previous clock cycle, and match the corresponding plurality of data frame hunt results obtained by the hunt processing module to the corresponding first starting byte of the first data frame as a successfully-matched hunt result within the current clock cycle.

9. The apparatus for locating a data frame according to claim 8, wherein the preprocessing module is configured to, after receiving each corresponding byte of the data stream within the current clock cycle, first perform the HEC calculation on values of every two adjacent bytes of the data stream and store obtained HEC calculation results of the values of every two adjacent bytes.

10. The apparatus for locating a data frame according to claim 9, wherein the hunt processing module comprises:
an HEC authentication module, configured to enable each respective framing state machine to select four consecutive adjacent bytes starting from a first byte of starting a hunt, compare HEC calculation results of values of first two adjacent bytes in the four consecutive adjacent bytes with values of last two adjacent bytes, and in case of equivalence, determine that a first byte in the first two adjacent bytes is the corresponding first starting byte of the first data frame.

11. The apparatus for locating a data frame according to claim 10, wherein the hunt processing module is configured to:
determine a length of the first data frame according to the values of the first two adjacent bytes, then determine a starting byte of a second data frame according to the length of the first data frame and the starting byte of the first data frame, comparing HEC calculation results of values of first two adjacent bytes with values of last two adjacent bytes starting from the starting byte of the second data frame, and in case of equivalence, determine that positions of the first data frame and the second data frame are correct, and record the starting bytes and length information of the first data frame and the second data frame in the hunt result; and
continue the data frame hunting process starting from the starting byte of the second data frame until a set hunt period corresponding to the current clock cycle ends.

12. The apparatus for locating a data frame according to claim 8, wherein the hunt result determining module comprises:
a previous hunt result processing module, configured to obtain a value of a payload length indicator field of a header of a last data frame within the previous clock cycle and a corresponding starting byte of the last data frame according to the previous corresponding data frame hunt result within the previous clock cycle, and determine a length of the last data frame within the previous clock cycle according to the value of the payload length indicator field; and
determine the corresponding first starting byte of the first data frame within the current clock cycle according to the length and the corresponding starting byte of the last data frame within the previous clock cycle; and
a match processing module, configured to, when the starting byte of the first data frame in the hunt result obtained by the hunt processing module is the same as the starting byte of the first data frame within the current clock cycle obtained by the previous hunt result processing module, and the hunt result is obtained by starting the hunt from the starting byte of the first data frame, determine that the hunt result is the data frame hunt result within the current clock cycle.

13. The apparatus for locating a data frame according to claim 12, wherein the hunt result determining module further comprises:
a hunt result transmitting module, configured to deliver the data frame hunt result within the current clock cycle and a state of the framing state machine when the hunt ends to a next clock cycle.

* * * * *